March 10, 1931. D. C. MORGAN 1,795,614
MULTIPLE LAMP HEADLIGHT FOR AUTOMOBILES
Filed July 7, 1930
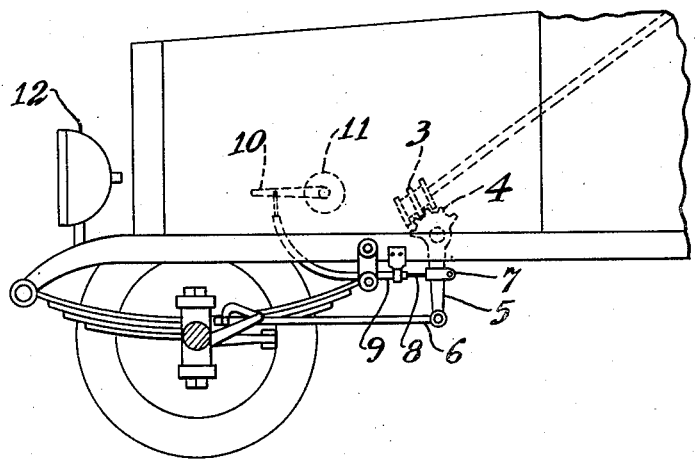
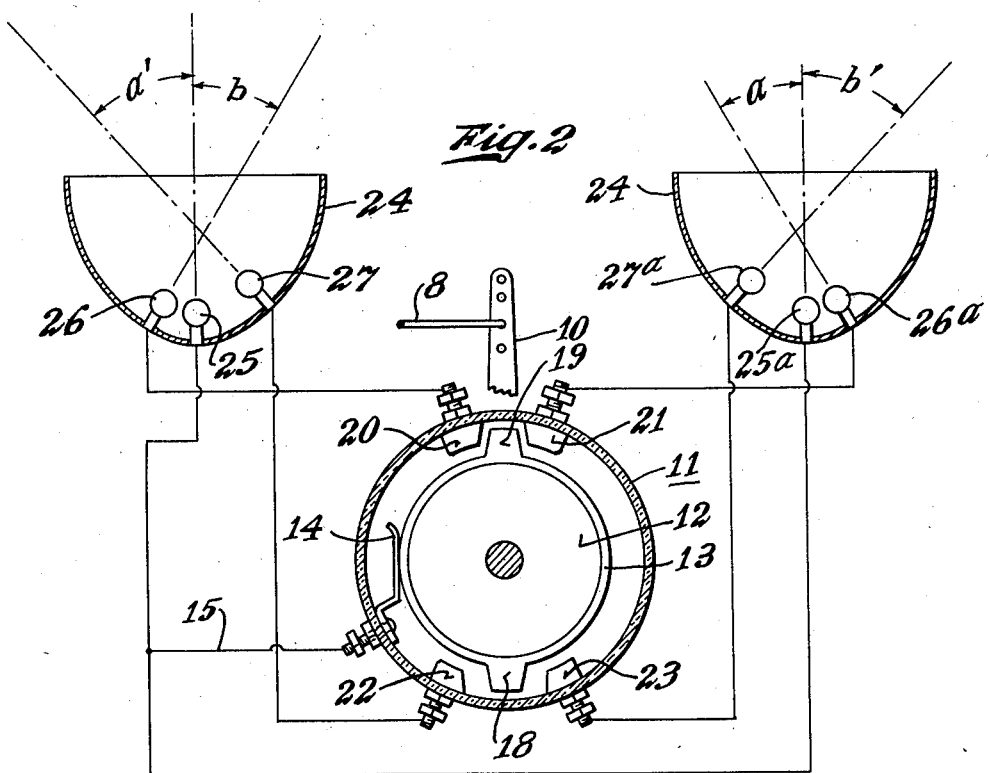
INVENTOR
D. C. Morgan
BY
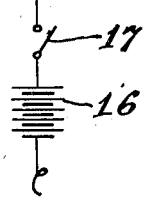
ATTORNEYS Patented Mar. 10, 1931

1,795,614

UNITED STATES PATENT OFFICE

DAVID C. MORGAN, OF BIRMINGHAM, ALABAMA, ASSIGNOR OF ONE-THIRD TO WM. N. DRAKE AND ONE-THIRD TO E. T. BOYD, BOTH OF BIRMINGHAM, ALABAMA

MULTIPLE-LAMP HEADLIGHT FOR AUTOMOBILES

Application filed July 7, 1930. Serial No. 465,951.

My invention relates to an improvement in headlights for automobiles which are designed and adapted automatically to supply supplemental laterally directed illumination to assist a driver in passing cars and in making turnouts when driving at night.

One object of my invention is to attain the ends in view by the incorporation of additional lamps within an ordinary headlight in such manner as not to change its appearance and yet so to take advantage of the reflector therein as to supply the necessary additional illumination of the roadway to facilitate the partial or complete turning of an automobile at night.

A further object of my invention is to provide two additional lamps in each headlight and to so arrange these lamps that they will become illuminated successively and automatically responsive to the steering of the automobile so that at first the additional light is thrown from one lamp at a relatively small angle to the line of travel on the desired side of the roadway, to be followed later, in the event a full turnout is intended, by the projection of light from the other lamp and at a much wider angle so that the roadway on the side to be turned into will be amply illuminated.

A further feature of my invention consists in providing one additional lamp closely adjacent to and on the outer side of the standard lamp in each headlight and in providing the second additional lamp spaced widely from and on the inner side of said standard lamp in each headlight. These three lamps in each headlight are preferably arranged in the focal plane, but only the standard lamp is at the focal center, of the reflector.

A further object of my invention is to provide separate circuits to the additional lamps and to control them automatically by a switch responsive to the steering gear of the car and adapted, as such gear is moved from normal operating position, to first illuminate the outside auxiliary lamp in one headlight and upon a further turning movement of the car to illuminate the inside auxiliary lamp in the other headlight. In this way an additional light at a relatively small angle from the main headlight ray is first thrown on the roadway for use when passing cars and then an additional wide angle light is thrown to light a road to be turned into.

My invention further comprises the novel details of construction and arrangements of parts, which in their preferred embodiment only are illustrated in the accompanying drawings which form a part of this specification, and in which:—

Fig. 1 is a fragmental view of the forward end of an automobile showing in side elevation the operating mechanism for the automatic switch which controls the auxiliary lamps in the headlights that is shown dotted in position.

Fig. 2 is a view showing in plan the arrangement of lamps in the headlights and also diagrammatically illustrating the circuits to the automatic switch for controlling the auxiliary lamps.

Similar reference numerals refer to similar parts throughout the drawings.

In the embodiment illustrated, I show conventionally an automobile having a steering worm gear 3 operating the segment 4 which rocks the lever 5 that operates the steering rod 6. I attach an adjustable clamp 7 to the lever 6 and connect to the clamp one end of a stiff wire 8 working in a flexible sheath 9 and connected to the arm 10 which operates the rotary switch 11 which controls the auxiliary lamp in the headlight 12. This arm 10 is provided with a series of holes so that any desired point of connection for the wire may be had.

The switch comprises a rotatable contact member 13 normally in circuit by a wiping contact with a spring conductor 14 connected by line 15 to one side of the battery 16. A hand switch 17, preferably on the dash, is provided to interrupt this circuit. The switch 12 carries opposite blades 18 and 19, the blade 19 working between two pairs of spaced spring contacts 20 and 21, and the blade 18 between like pairs of contacts 22 and 23.

Each headlight has a reflector 24 of the usual parabolic design with the standard central headlight lamp 25 or 25a in position at its focal center and in a plane with one auxiliary lamp 26 or 26a on its outer side and an auxiliary lamp 27 or 27a on its inner side and further removed therefrom than the lamp 26 or 26a. Thus, as shown, the left hand headlight carries the lamps 25, 26 and 27 with the lamp 26 arranged to throw a small angle ray to the right and lamp 27 a wider angle ray to the left of the main ray from lamp 25; and in the right hand headlight the lamp 26a throws a small angle ray to the left and lamp 27a a wide angle ray to the right of the main ray from the headlight lamp 25a.

The contact 20 is connected by a suitable wire with lamp 26; the contact 21 with lamp 26a; the contact 22 with lamp 27; and the contact 23 with lamp 27a. These lamps have the usual return circuit to the battery 16, preferably by being grounded to the automobile frame, and the lamps 25, 25a are connected by an independent circuit 28 with the battery.

It will be observed that the points 20 and 21 are much closer to the interposed switch blade 19 than the switch points 22 and 23 are to the interposed switch blade 18. It, therefore, follows that when the blades move clockwise they will first close contact 21 and then later will close contact 22, and when moved counter-clockwise they will similarly successively close the contacts 20, 23. The amount of movement necessary to cause the blade 19 to engage the contact 20 or 21 is just sufficient to cover the customary deflection of the automobile necessary for passing other cars on the road, but in order to cause blade 18 to close either of the contacts 22, 23, it will require more of a deflection of the car than is incidental to normal steering of the car.

The switch mechanism is of the customary blade type working between spaced spring contact fingers over or between which it makes a wiping contact. The sheath may have suitable brackets, such as 28, to hold and guide it to such location as may be most convenient for the switch 11.

In operation, the normal manipulation of the steering gear in driving will not cause the automatic switch to engage and close the circuits to any of the auxiliary lamps but when in passing at night the car is swerved to the right, this deflection will close the circuit to auxiliary lamp 26 and will increase the arc of the light ray by the angle B, indicated on Fig. 2. If the driver intends to turn the car to the right at right angles the further movement of the switch will close the circuit to lamp 27a and will increase the added arc of illumination by that indicated at B'. The operation is the same when the car is being turned to the left.

Though I have described with great particularity the details of the embodiment of the invention herein shown, it is not to be construed that I am limited thereto, as changes in arrangement and substitution of equivalents may be made by those skilled in the art without departing from the invention as defined in the appended claims.

What I claim is:—

1. In combination with the headlights of an automobile, each having the main lamp and two auxiliary lamps and reflectors therefor, the auxiliary lamps being grouped for successive control for each direction of turning, and means to successively illuminate the auxiliary lamps of each group which are disposed to give a widening of the belt of light laterally in the direction the automobile is being turned.

2. In combination with the headlights of an automobile, each having the main lamp and two auxiliary lamps which are disposed at different distances from their respective adjacent main lamps and reflectors therefor, the auxiliary lamps being grouped for successive control for each direction of turning, and means to successively illuminate the auxiliary lamps of each group which are disposed to give a widening of the belt of light laterally in the direction the automobile is being turned.

3. In a pair of cooperating headlights, a reflector for each headlight, a main lamp positioned at the focal center of each reflector, and an auxiliary lamp positioned at each side of each main lamp and at different distances therefrom.

4. In a pair of cooperating headlights, a reflector for each headlight, a main lamp positioned at the focal center of each reflector, an auxiliary lamp positioned at each side of each main lamp and at different distances therefrom, and means adapted to select the auxiliary lamps to be illuminated.

5. In a pair of cooperating automobile headlights, a reflector for each headlight, a main lamp positioned at the focal center of each reflector, and an auxiliary lamp positioned at each side of each main lamp at different distances therefrom and in the same focal plane therewith, the auxiliary lamps being independently controlled and disposed to throw rays of light diverging laterally at different angles to the rays of the main lamps.

6. In a pair of cooperating automobile headlights, a reflector for each headlight, a main lamp positioned at the focal center of each reflector, an auxiliary lamp positioned outwardly from each main lamp, an auxiliary lamp positioned inwardly from each main lamp, the inwardly positioned auxiliary lamps being located at a greater distance from the main lamps than the outwardly positioned auxiliary lamps, and means adapted to first select and illuminate the outwardly positioned auxiliary lamps and then to select and illuminate the inwardly positioned auxiliary lamps.

In testimony whereof I affix my signature.

DAVID C. MORGAN.